United States Patent [19]

Holthoff

[11] Patent Number: 4,666,317

[45] Date of Patent: May 19, 1987

[54] BEARING ASSEMBLIES FOR ROTATING SHAFTS

[75] Inventor: Helmut Holthoff, Düsseldorf, Fed. Rep. of Germany

[73] Assignee: Kocks Technik GmbH & Co., Hilden, Fed. Rep. of Germany

[21] Appl. No.: 839,072

[22] Filed: Mar. 13, 1986

[30] Foreign Application Priority Data

Mar. 16, 1985 [DE] Fed. Rep. of Germany ....... 3509613

[51] Int. Cl.$^4$ ............................................. F16C 19/54
[52] U.S. Cl. ................................................... 384/447
[58] Field of Search ............... 384/447, 255, 583, 581, 384/519

[56] References Cited

U.S. PATENT DOCUMENTS 2,748,461  6/1956  Ohlsson ............................... 384/583
3,361,490  1/1968  Bassan ................................... 384/447
3,467,450  9/1969  Schmidt et al. ....................... 384/447

Primary Examiner—Lenard A. Footland
Attorney, Agent, or Firm—Buell, Ziesenheim, Beck & Alstadt

[57] ABSTRACT

The invention concerns a bearing mounting for rotating shafts, in which the main bearings are roller bearings and the shafts turn at more than ca. 3000 r.p.m. With the aid of auxiliary bearings, these main bearings are loaded radially according to the invention in order to prevent the rollers and roller cages of the main bearings from rotating with only a reduced r.p.m. in the case of non-loaded rotating shaft and being suddenly accelerated with a sudden loading of the shaft and thus wearing prematurely. This radial load results from the fact that the auxiliary bearings are maintained eccentrically shifted.

10 Claims, 8 Drawing Figures

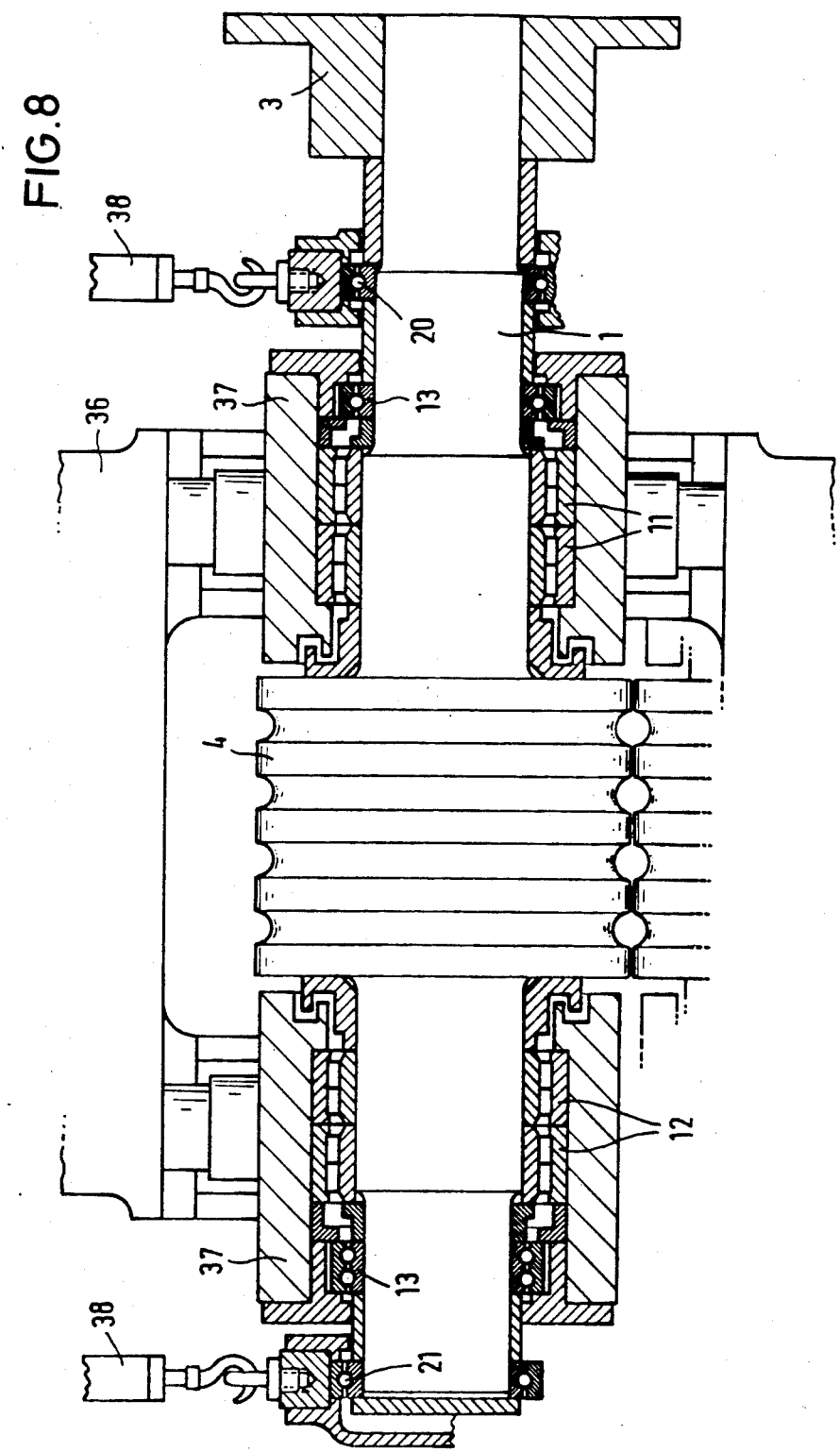

BEARING ASSEMBLIES FOR ROTATING SHAFTS

This invention relates to bearing assemblies for rotating shafts and particularly to bearing assemblies for rolling mill shafts having a drive at one end and a roll and the opposite end with at least two main bearings that transfer radial and possibly axial forces to a bearing housing and at least one auxiliary bearing shifted or capable of being shifted radially eccentrically to the main bearings.

In a familiar bearing assembly of this type (DE-AS No. 22 64 333) the roller shaft bearing assembly of a roll stand for sheet strip is involved, in which the main and auxiliary bearings are designed as friction bearings, the r.p.m.'s of such roll stands are relatively low, such that no difficulties arise with respect to lubrication and heat removal when friction bearings are used. The auxiliary bearings used there serve, in collaboration with the main bearings, to exert a great bending moment on the rolls or roll shafts, which is opposed to the bending moment that arises due to the deformation of the rolled goods. In this manner it should be achieved that the roll axis also remains straight during the rolling operation so that the rolled goods acquires as uniform a thickness as possible over its entire width. For this purpose, the auxiliary bearings of hydraulically operating back-bending cylinders are loaded in the radial direction with a substantial pressure in order to bend the rolls or roll shafts against the rolling force and compensate the latter as much as possible.

In the case of shafts mounted in friction bearings, in comparison with mounting with roller bearings, a considerably greater amount of heat develops, which increases substantially with increasing r.p.m. It is thus necessary in the case of friction bearings and high r.p.m.'s to pass large amounts of lubricating oil through the bearings in order to remove the heat that develops. This presumes large conduit cross sections, substantial amounts of oil in reservoirs that take up a lot of space and possibly also a recooling installation, which is the case for example in high-speed roller shafts for wire rolling stands. Because friction bearings are also susceptible to the penetration of dirt, the use of friction bearings is problematical in a hot and dirty environment and with high speeds, as in hot-rolling stands for wire. Therefore, the use of roller bearings is recommended for these reasons. They not only generate less heat than friction bearings, but are also less sensitive to the penetration of dirt.

When friction bearings are used anyway, especially in high-speed roll shafts, it is due to the fact that roller bearings are sensitive to sudden loads. However, the latter cannot be avoided in many cases, e.g., on roll shafts. If the beginning of a bar or wire runs into a pass opening formed by rolls, the rolls and thus the roll shafts, including their bearings, become substantially loaded in a shock-like manner. This loading also frequently occurs in the case of each new bar or wire. So long as the bar or wire has not yet reached the pass opening, the rolls and the roll shafts driven by the drive rotate at high speed, in which case the bearings are essentially unloaded. Consequently, the roller bodies of the bearings and the cages holding them rotate with considerable backlash, that is, they move considerably more slowly than corresponds to the operating r.p.m. under load. This is a result of the play in the roller bearings. However, as soon as the rolled goods reaches the pass opening and thus the rolls, the bearings of the roll shaft are loaded suddenly, especially in the radial direction. The rollers are then pressed against the outer ring in the range of a peripheral segment of the inner ring of the roller bearing, whereby the backlash is eliminated and the rollers and the cage holding them are suddenly accelerated from the previous low drift r.p.m. to the high operating r.p.m. This acceleration leads to intense wear phenomena on the roller bearing cage and quickly to destruction of the bearing, such that it must be replaced. Consequently, the incorporation of friction bearings, in spite of the said shortcomings of these bearings, is preferred in beddings that rotate at high speeds and are subject to alternating sudden stresses, as for example the bearings for high-speed roll shafts.

The invention proposes a bearing assembly for a rotating shaft, especially for high-speed roll shafts, one that is more efficient under alternating load and less susceptible to breakdwon than the familiar structural types.

This goal is achieved according to the invention in that the main bearings of the shaft rotating at more than ca. 3000 r.p.m. are designed in a familiar manner as roller bearings, and that the eccentric auxiliary bearing or bearings load the main bearings with a radial pressure that eliminates only the backlash of the main bearing rollers and cages when the shaft is idling. In contrast to the familiar construction described above, according to the invention the shaft is not bent back, but the main bearings are only very slightly loaded in the radial direction over the shaft through the eccentric auxiliary bearings. This loading is to be just enough to avoid the backlash of the roller bearings and the roller bearing cages during the otherwise unloaded operating state of the shaft, which is possible with relatively little force.

The result of this is that the roller bearings and the cages of the main bearings and also the auxiliary bearings always rotate with an unloaded shaft with the same r.p.m. as is also valid for the loaded operating state. There is thus no sudden acceleration during the transition from the unloaded to the loaded operating state and thus also no increased wear or premature breakdown of the roller bearings. The assembly according to the invention thus facilitates the use of roller bearings where high speeds and sudden stresses arise, as is the case in the roll shafts of wire and bar roll stands. The amount of heat that is substantially generated and must be removed is reduced solely through the use of roller bearings; it is also reduced by the fact that the heating due to the backlash otherwise present in the roller bearings no longer occurs. The advantageous consequences are smaller oil line cross sections, smaller oil reserves and less cooling power in the oil circuit. There is also the lesser susceptibility of the bearings to damage with the penetration of dirt, which is of considerable importance in rough roll mill operation.

In a preferred embodiment of the invention, each auxiliary bearing is shifted or is capable of being shifted in the direction of the resulting force of all the radial operating forces acting on the shaft. In this manner the radial pressure generated by the auxiliary bearings on the main bearings is not cancelled by the operating forces, but rather enhanced, but this has no effect on the backlash behavior. Additional accelerations and movements of the rollers and the roller cages, which could otherwise arise due to a change in the direction of load, are avoided.

The eccentricity of the auxiliary bearings, with which the radial pressure on the main bearings is produced, can be produced in various ways. For example, it is possible to insert the auxiliary bearing or bearings in eccentric boreholes of the bearing housing. In another implementation of the invention, the auxiliary bearing or bearings are inserted in bearing bushes with an eccentric inner borehole and the latter are inserted in concentric boreholes of the bearing housing. Furthermore, the auxiliary bearing or bearings can also be inserted in radially displaceable bearing bushes or bearing housing components. The implementation form selected is generally dependent on the design of the bearing housing and the manufacturing possibilities available.

It is particulary advantageous if each auxiliary bearing is eccentrically held through a elastic intermediate element. Manufacturing tolerances and other irregularities, as well as those that arise during operation, e.g., due to temperature changes, can be compensated by the elastic intermediate element. An advantageous vibration damping of the shaft is also achieved. Such an intermediate element can consist of a bearing bush of elastic material, but also of flat, plate or coil springs that hold the auxiliary bearing in its eccentric position. It is possible here to have the loading of the main bearings variably and readily adjustable with simple structural means. In general, the eccentricity of each auxiliary bearing is dimensioned between a few hundredths of a millimeter and one millimeter, which is essentially dependent on the diameter of the bearings and the construction of the roller bearings.

In an advantageous embodiment of the invention, an auxiliary bearing is assigned to each main bearing in a slight axial spacing. Each main bearing can in this manner be loaded precisely with only the absolutely necessary radial pressure, in which case relatively light auxiliary bearings can be selected. On the other hand, it is also possible in the case of main bearings operating as radial bearings and a separate axial bearing to form the latter at the same time as the auxiliary bearing and hold it eccentrically. In many familiar assemblies the axially acting forces are absorbed by a separate bearing, which is frequently designed as an angular ball bearing. Such angular ball bearings or correspondingly designed roller bearings are, in addition to their natural purpose of transferring axial forces to the bearing housing, also quite capable of absorbing the relatively slight radial load according to the invention, which results from the fact that a smaller radial pressure is exerted on the main bearing in order to avoid the backlash. A correspondingly eccentric arrangement of this axial bearing and thus its use as an auxiliary bearing are thus completely possible and spares the arrangement from having one or even additional other auxiliary bearings. It is not absolutely necessary to provide a separate auxiliary bearing for each main bearing; rather, the radial load on the main bearings for avoiding backlash can also be achieved with only a single auxiliary bearing.

In another embodiment of the invention it is possible for the auxiliary bearing or bearings to be designed as guide shoes that only partially enclose the shaft. After all, it is merely a matter of exerting an appropriate radial pressure on the main bearings by the auxiliary bearings, which can also be achieved with the aid of such guide shoes.

In the foregoing general description I have set out certain objects, purposes and advantages of this invention. Other objects, purposes and advantages of this invention will be apparent from a consideration of the following description and the accompanying drawings in which:

FIG. 8 shows a bilateral roll shaft assembly with separately arranged auxiliary bearings.

Figure 1:
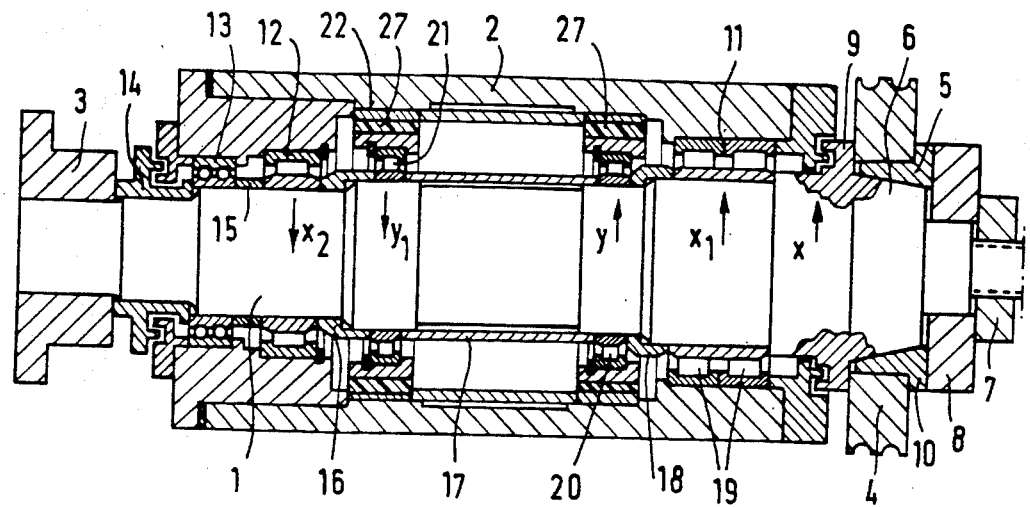
FIG. 1 shows a roll shaft assembly with two radial, one axial and two auxiliary bearings.

In FIG. 1, a roll shaft 1 is rotatably mounted in a bearing housing 2. It can be driven through a coupling flange 3. A roll 4 is detachably fastened on the end section of the roll shaft 1 opposite the coupling flange 3. For this purpose, an inwardly conical spring collet 5 is shoved onto a conical shoulder 6 of the roll shaft 1, by a nut 7 through a pressure ring 8, such that the spring collet 5 is expanded in the radial direction and the roll 4 is held thereby, in which it is pressed against the wall of the cylindrical inner borehole of the roll 4. In the axial direction the roll 4 is held by a collar 9 of the roll shaft 1 and on the other hand by a collar 10 of the spring collet 5.

A double-row cylindrical roller bearing serves as the main bearing 11 in the region of the roll 4 and a second single-row cylinderical roller bearing is located in the vicinity of the coupling flange 3 as the second main bearing 12. Both main bearings 11 and 12 transfer radial forces from the over-mounted roll 4 through the roll shaft 1 to the bearing housing 2. Axial forces are transferred from a third main bearing 13 to the bearing housing 2. A double-row angular ball bearing is involved here; it is stopped in the axial direction on the roll shaft 1 and in the bearing housing 2, with the aid of the coupling flange 3, a labyrinth bush 14 and the spacing bushes 15–18.

The arrow x designated in the region of the roll 4 indicates the force that arises during rolling and basically loads the bearing assembly. Consequently, the main bearing 11 is loaded by a force $x_1$ and the main bearing 12 by a force $x_2$ in opposite radial directions. If these forces $x_1$ and $x_2$ do not arise, for example, if no rolled goods are being rolled by the roll 4, while the latter is rotating with its operating r.p.m. of more than 3000, backlash arises in the main bearings 11 and 12 in the rollers 19 and in the roller cages (not shown). These parts then rotate with a considerably lower r.p.m. than during normal rolling operation with the bearing loads that then arise. In order to prevent the backlash, auxiliary loads 20 and 21 are assigned according to the invention to the two main bearings 11 and 12 in FIG. 1. These auxiliary bearings 20 and 21 are shifted in the radial direction by a slight amount with respect to the axis of rotation of the roll shaft 1, though only by a small amount (which cannot be represented in the drawings) of up to one millimeter, which is dependent on the size and construction of the main bearings 11 and 12. The auxiliary bearings 20 and 21 thus exert additional forces, which are indicated by the arrows y and $y_1$. Because the eccentricity of the auxiliary bearings 20 and 21 is not oriented in the same direction, but in opposite directions, the directions of the forces y and $y_1$ are also opposite. Thus, the auxiliary bearing 20 acts on the pertinent main bearing 11 with a force y, which acts parallel but in the same direction as the force $x_1$, which arises under normal operating load. The same is also true for the force $y_1$ or $x_2$ of the auxiliary bearing 21 and the main bearing 12, except that the two forces are active in opposite directions. Due to the forces exerted by the auxiliary bearings 20 and 21, y and $y_1$, the main bearings 11 and 12 are radially loaded in spite of a lack of load on the roll 4 and thus a lack of the forces $x_1$ and/or $x_2$, such that the above backlash of the roller 19 and the roller cage cannot develop. In order to achieve this, it is not necessary for the forces 6 and $y_1$ to have the same magnitude as the operating forces $x_1$ and $x_2$; rather, a considerably smaller force is sufficient, which in turn is different from bearing type to bearing type and if necessary can be determined empirically. The eccentric arrangement of the auxiliary bearings 20 and 21 is achieved in FIG. 1 in that the boreholes 22 receiving them in the bearing housing 2 are effected eccentrically to the other boreholes.

Figure 2:
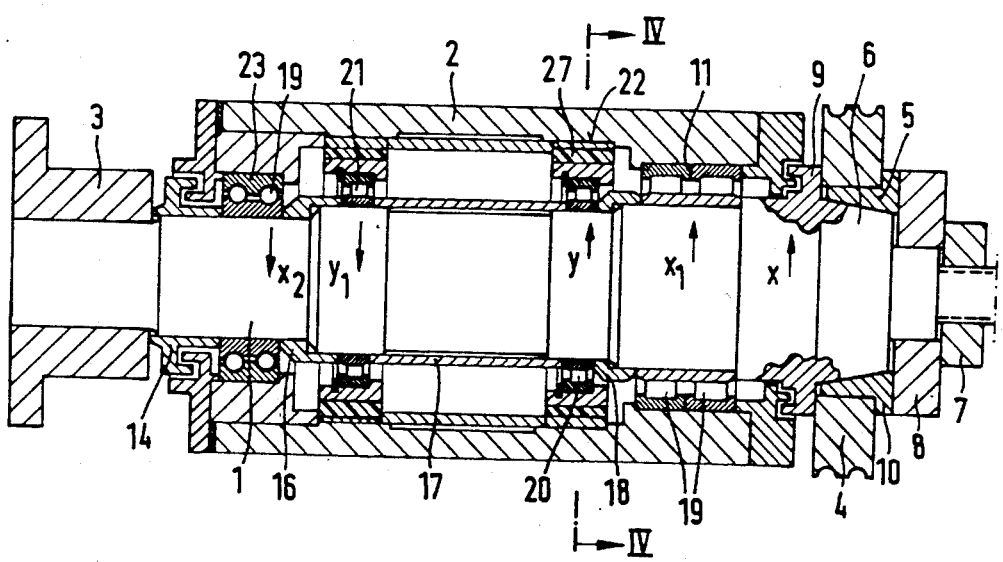
FIG. 2 shows a second embodiment of roll shaft assembly with one radial, one radial-axial bearing and two auxiliary bearings.

The assembly of FIG. 2 differs from that of FIG. 1 only in that the second main bearing 12 transferring the radial forces and the third main bearing 13 transferring the axial forces are combined into a main bearing 23, which is designed as a larger double-row angular ball bearing. In this manner one main bearing can be dispensed with. The auxiliary bearing 21 is assigned to the main bearing 23.

Figure 3:
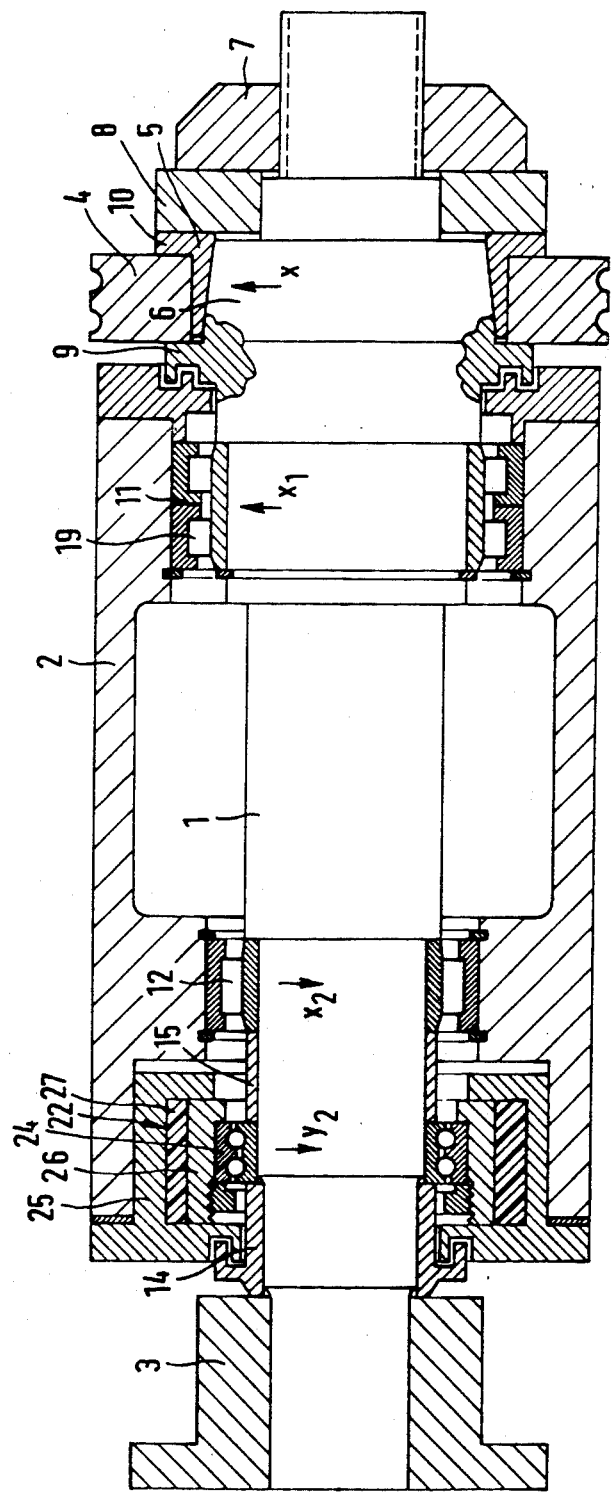
FIG. 3 shows a second roll shaft assembly with two radial and one axial bearing, which is designed as an auxiliary bearing.
Figure 4:
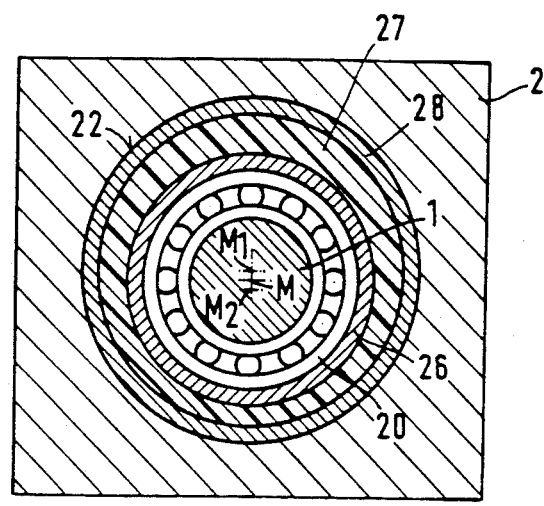
FIG. 4 shows a section along the line IV—IV of FIG. 2.

In the embodiment according to FIG. 3 the bearing assembly is considerably simplified through the fact that only one auxiliary bearing 24 is assigned to the main bearings 11 and 12. The auxiliary bearing 24 loads the main bearings 11 and 12 with the force $y_2$ in opposite directions and thus replaces the operating forces $x_1$ and $x_2$ to a small extent if the roll 4 is not loaded. This occurs through the fact that the auxiliary bearing 24 is incorporated in an eccentric borehole 22 of a bush 25 of the bearing housing 2. The auxiliary bearing 24 is simultaneously designed in FIG. 3 as an axial bearing, such that the total assembly comes out with only three roller bearings FIG. 4 shows a section through one of the auxiliary bearings 20 of FIG. 2. The bearing housing 2 is represented with corners, but almost any other cross sectional form is conceivable. The bearing housing 2 has the eccentric borehole 22 already mentioned, whose midpoint is designated by $M_1$, which is slightly above the midpoint M, which is valid for the roll shaft 1 and all the other boreholes of the bearing housing 2, with the exception of the borehole for the second auxiliary bearing 21, whose eccentric borehole 22, which is not visible in FIG. 4, has a different midpoint $M_2$, which is below the midpoint M of the roll axis 1. The auxiliary bearing 20 is shoved concentrically on the roll shaft 1 and is also concentrically inserted into a bearing bush 26. The bearing bush 26 is surrounded by an elastic intermediate element 27, which is bushing-like in the embodiment according to FIG. 4 and consists for example of a suitable elastic synthetic material. An outer bearing bush 28 surrounds the elastic intermediate element 27, the roll shaft 1, the auxiliary bearing 20, the bearing bush 26 and the elastic intermediate element 27. They and the outer bearing bush 28 are all shoved concentrically into each other such that the midpoint M is valid for all these components. Only in the assembled state, i.e., when all are incorporated in the bearing housing 2, is the outer bearing bush 28 shifted upward by the eccentric borehole 22 of the bearing housing 2 in FIG. 4, whereby the elastic intermediate element 27 becomes thicker at the top than at the bottom, because the roll shaft 1 cannot also be shifted upward due to the concentric main bearings 11 and 23 (FIG. 2), which is also valid for the inner ring of the auxiliary bearing 20. To eliminate the play in the auxiliary bearing 20, its outer ring is scarcely perceptibly shifted upward together with the bearing bush 26 under the effect of the pressure that the outer bearing bush 28 exerts on it through the elastic intermediate element 27 in the lower cross sectional half. In this manner, the auxiliary bearing 20 exerts radial pressure through the roll shaft 1 on the main bearings 11 and 23.

Figure 5:
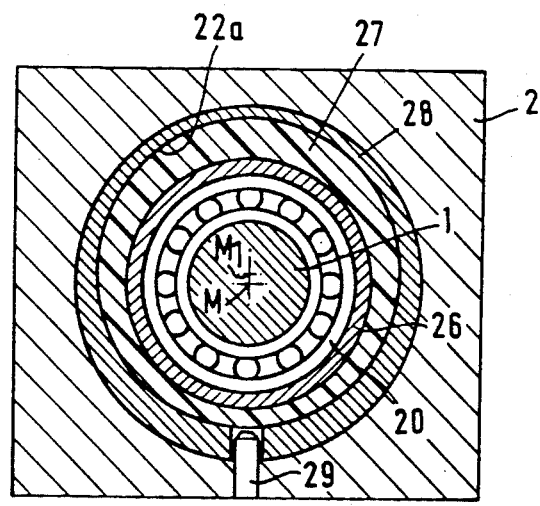
FIG. 5 shows an alternative to FIG. 4.

FIG. 5 differs from FIG. 4 only in that no eccentric borehole 22 is effected in the bearing housing 2; rather, the outer bearing bush 28 has an eccentric inner borehole 22a. This facilitates the manufacture of the bearing housing 2 because it then has only concentric inner boreholes and only the outer bearing bush 28 receives an eccentric inner borehole 22a. However, the effect is the same as in FIG. 4. In order to prevent the outer bearing bush 28 from rotating inside of the bearing housing 2, it is fixed with a pin 29. In this manner it is assured that the loading direction of the main bearings 11, 12 and 23 corresponds to the loading direction of the operating forces.

Figure 6:
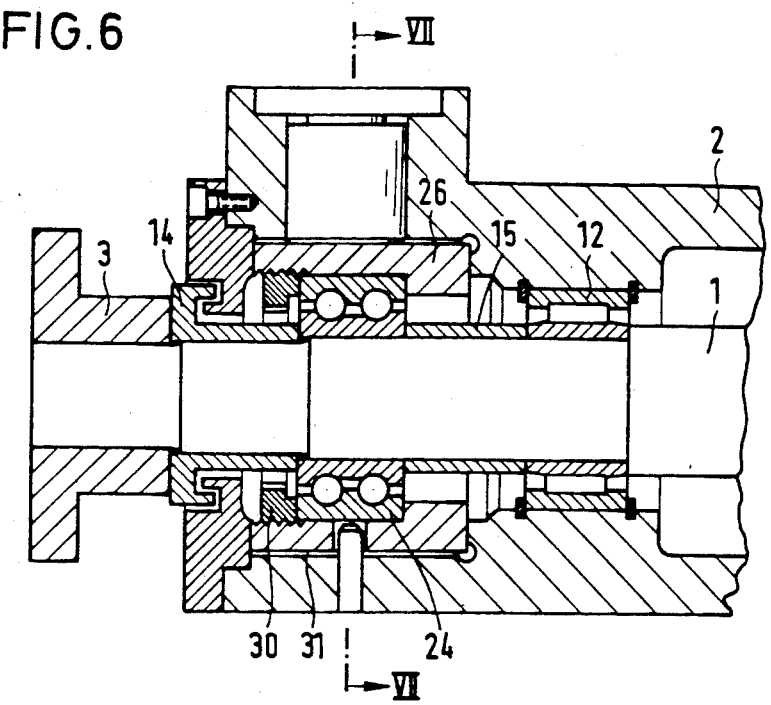
FIG. 6 shows part of a third embodiment of roll shaft assembly with spring-loaded auxiliary bearings.
Figure 7:
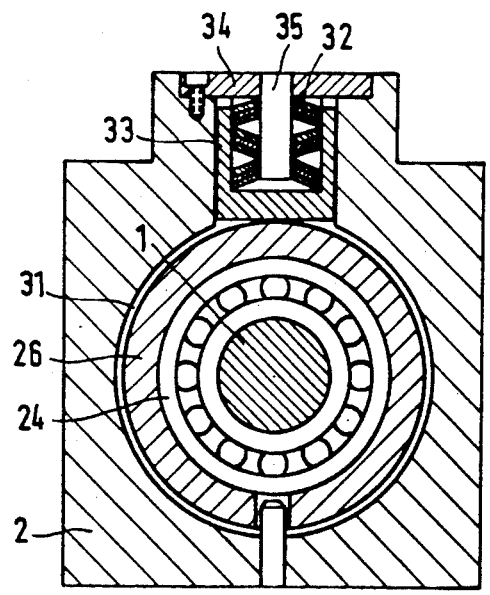
FIG. 7 shows a section along the line VII—VII of FIG. 6.

In the embodiment according to FIGS. 6 and 7, the auxiliary bearing 24 is concentrically inserted into a bearing bush 26 and secured therein in the axial direction with a nut 30. The bearing bush 26 is however located in a borehole 31 of the bearing house 2 that is definitely larger than the outside diameter of the bearing bush 26, such that it is possible to shift the latter and thus the auxiliary bearing 24 radially. As the elastic intermediate element 32, there is here a spring package consisting of plate springs in a guide bush 33, which lies with its closed bottom on the outside on the bearing bush 26. The plate springs are supported on the one hand on a lid 34 screwed on the bearing housing 2. The lid 34 has a guide bolt 35. The plate springs are supported on the other hand on the bottom of the guide bush 33. The dimensions, especially of the guide bush 33, are chosen so that the plate springs exert sufficient pressure to load the main bearings 11 and 12 adequately through the auxiliary bearing 24 when no rolling pressure is present.

FIG. 8 shows a bilateral roll shaft bedding, as can occur in roll stands with incorporated pieces. Built-in pieces 37 are bedded in a displaceable manner in a stand 36 and they have the function of the bearing housing 2. The main bearings 11 and 12 for the radial forces and the axial bearing 13 are located in the built-in pieces 37. The auxiliary bearings 20 and 21 are located outside of the built-in pieces 37, in which case the elastic intermediate elements 38 consist of tension springs or hydraulic working cylinders, which are anchored in a manner not shown on the roll stand housing 36 and load the main bearings 11 and 12 in the same radial direction through the auxiliary bearings 20 and 21.

In the foregoing specification, I have set out certain preferred embodiments and practices of this invention, however, it will be understood that this invention may be otherwise embodied within the scope of the following claims.

I claim:

1. A bearing assembly for a revolving shaft, especially for a roller shaft, comprising a bearing housing, at least two main bearings that transfer radial and possibly axial operating forces mounted in said bearing housing and spaced apart axially along said shaft, at least one auxiliary bearing in said housing shifted in the radial direction eccentrically to the main bearings or held in a displaceable manner, characterized in that the main bearings of the shaft, rotating at more than about 3000 r.p.m., are designed as roller bearings and that the eccentric auxiliary bearing or bearings load the main bearings with a radial pressure that eliminates only the backlash of the main bearing roller bodies and cages during the idling of the shaft.

2. A bearing assembly according to claim 1, characterized in that each auxiliary bearing is shifted or can be shifted eccentrically in the direction of the resulting force of all the radial operating forces acting on the shaft.

3. A bearing assembly according to claims 1 or 2, characterized in that the auxiliary bearing or bearings are inserted into eccentric bearing boreholes of the bearing housing.

4. A bearing assembly according to claims 1 or 2, characterized in that the auxiliary bearing or bearings are inserted into bearing bushes with eccentric inner boreholes and the latter into concentric bearing boreholes of the bearing housing.

5. A bearing assembly according to claims 1 or 2, characterized in that the auxiliary bearing or bearings are inserted into radially displaceable bearing bushes or components of the bearing housing.

6. A bearing assembly according to claim 1, characterized in that each auxiliary bearing is held eccentrically through an elastic intermediate element.

7. A bearing assembly according to claim 1 characterized in that the eccentricity of each auxiliary bearing is dimensioned down to one millimeter.

8. A bearing assembly according to claim 1, characterized in that an auxiliary bearing is assigned to each main bearing at a slight axial distance.

9. A bearing assembly according to claim 1 characterized in that in the case of main bearings operating as radial bearing and a separate axial bearing the latter is developed jointly with the auxiliary bearing and held eccentrically.

10. A bearing assembly according to claim 1 characterized in that the auxiliary bearing or bearings are designed as guide shoes that surround the shaft only partially.

* * * * *